(12) United States Patent
Kondo et al.

(10) Patent No.: US 11,802,952 B2
(45) Date of Patent: Oct. 31, 2023

(54) POSITION DETECTING APPARATUS

(71) Applicants: SOKEN, INC., Nisshin (JP); DENSO CORPORATION, Kariya (JP)

(72) Inventors: Katsuhiko Kondo, Nisshin (JP); Takuya Takayama, Kariya (JP)

(73) Assignees: SOKEN, INC., Nisshin (JP); DENSO CORPORATION, Kariya (JP)

( * ) Notice: Subject to any disclaimer, the term of this patent is extended or adjusted under 35 U.S.C. 154(b) by 504 days.

(21) Appl. No.: 17/110,335

(22) Filed: Dec. 3, 2020

(65) Prior Publication Data

US 2021/0088644 A1     Mar. 25, 2021

Related U.S. Application Data

(63) Continuation of application No. PCT/JP2019/022342, filed on Jun. 5, 2019.

(30) Foreign Application Priority Data

Jun. 5, 2018 (JP) .................. 2018-107662

(51) Int. Cl.
*G01S 13/42* (2006.01)
*G01S 13/60* (2006.01)
*G01S 13/72* (2006.01)
*G01S 13/931* (2020.01)

(52) U.S. Cl.
CPC ............ *G01S 13/42* (2013.01); *G01S 13/60* (2013.01); *G01S 13/72* (2013.01); *G01S 13/931* (2013.01)

(58) Field of Classification Search
CPC .......... G01S 13/931; G01S 13/589; G01S 13/93271; G01S 13/42; G01S 13/584; G01S 13/72; G01S 13/60; G01S 2013/932

USPC ............... 342/146, 70, 104, 118, 61
See application file for complete search history.

(56) References Cited

U.S. PATENT DOCUMENTS

| 8,115,669 | B2* | 2/2012 | Mitsumoto | G01S 13/58 342/107 |
| 10,585,188 | B2* | 3/2020 | Millar | H01Q 1/3233 |
| 11,119,190 | B2* | 9/2021 | Morinaga | G01S 13/931 |

(Continued)

FOREIGN PATENT DOCUMENTS

JP    2012-194039 A    10/2012

*Primary Examiner* — Vladimir Magloire
*Assistant Examiner* — Michael W Justice
(74) *Attorney, Agent, or Firm* — MASCHOFF BRENNAN

(57) ABSTRACT

The position detecting apparatus repeatedly acquires, from a radar apparatus, object information including at least an object distance as a distance between the radar apparatus and a reflecting object and a relative speed between the radar apparatus and a reflecting object. The position detecting apparatus calculates a speed ratio as a ratio between the relative speed and the travelling speed. The position detecting apparatus calculates, based on the speed ratio, a projection distance between a projected position of the reflecting object projected onto a projection plane and a position of the radar apparatus on the projection plane, the projection plane having a predetermined angle with respect to a center axis indicating a direction along which the radar waves are transmitted by the radar apparatus and including the radar apparatus. The position detection apparatus calculates the position of the reflecting object based on the calculated projection distance.

11 Claims, 13 Drawing Sheets

(56) References Cited

U.S. PATENT DOCUMENTS

| | | | |
|---|---|---|---|
| 2008/0204306 A1* | 8/2008 | Shirakawa | G01S 13/589 |
| | | | 342/118 |
| 2011/0068970 A1* | 3/2011 | Mitsumoto | G01S 13/931 |
| | | | 342/113 |
| 2014/0274124 A1* | 9/2014 | Cheng | G01S 5/0072 |
| | | | 455/456.1 |
| 2017/0307749 A1* | 10/2017 | Shimizu | G08G 1/166 |
| 2019/0033442 A1* | 1/2019 | Millar | G01S 13/931 |
| 2019/0118807 A1* | 4/2019 | Takaki | G08G 1/16 |
| 2019/0179002 A1* | 6/2019 | Takayama | G01S 13/726 |
| 2019/0187267 A1* | 6/2019 | Li | G01S 13/931 |
| 2019/0187269 A1* | 6/2019 | Tong | G01S 7/003 |
| 2019/0219673 A1* | 7/2019 | Morinaga | G01S 7/40 |

* cited by examiner

POSITION DETECTING APPARATUS

CROSS-REFERENCE TO RELATED APPLICATION

This application is the U.S. bypass application of International Application No. PCT/JP2019/022342 filed Jun. 5, 2019 which designated the U.S. and claims priority to Japanese Patent Application No. 2018-107662, filed Jun. 5, 2018, the contents of which are incorporated herein by reference.

BACKGROUND

Technical Field

The present disclosure relates to a position detecting apparatus that detects a position of an object using a radar apparatus mounted on a mobile body.

Description of the Related Art

A radar apparatus is disclosed in which a height of a reflecting object is estimated. This radar apparatus is configured to predict intensity of reflected waves in the current signal processing period with respect to intensity of reflected waves in the past signal processing period for each expected height for a plurality of types of object so as to calculate a per-height reflected wave intensity, and estimates the height of the reflecting object based on a coincident rate between an actually measured reflected wave intensity and the per-height reflected wave intensity.

SUMMARY

One aspect of the present disclosure is a position detecting apparatus provided with an object information acquiring unit, a travelling speed information acquiring unit, a speed ratio calculation unit, a projection distance calculation unit and a position calculation unit.

DESCRIPTION OF THE PREFERRED EMBODIMENT

As an example of a conventional art, a patent literature (i.e. JP-A-2012-194039) discloses a radar apparatus that estimates a height of a reflecting object. The radar apparatus disclosed in the above-mentioned patent literature predicts intensity of reflected waves in the current signal processing period with respect to intensity of reflected waves in the past signal processing period for each expected height for a plurality of types of object so as to calculate a per-height reflected wave intensity, and estimates the height of the reflecting object based on a coincident rate between an actually measured reflected wave intensity and the per-height reflected wave intensity.

However, as a result of inventor's keen research, according to the technique disclosed in the above-mentioned patent literature, since reference data showing a relationship between the relative distance and the reflected wave intensity for each expected height of the plurality of types of object is required to be measured in advance, problems arise in which a workload of the developer of the radar apparatus increases in order to implement the position detecting function, or the memory required for storing the reference data increases.

First Embodiment

Hereinafter, with reference to the drawings, a first embodiment according to the present disclosure will be described.

Figure 1:
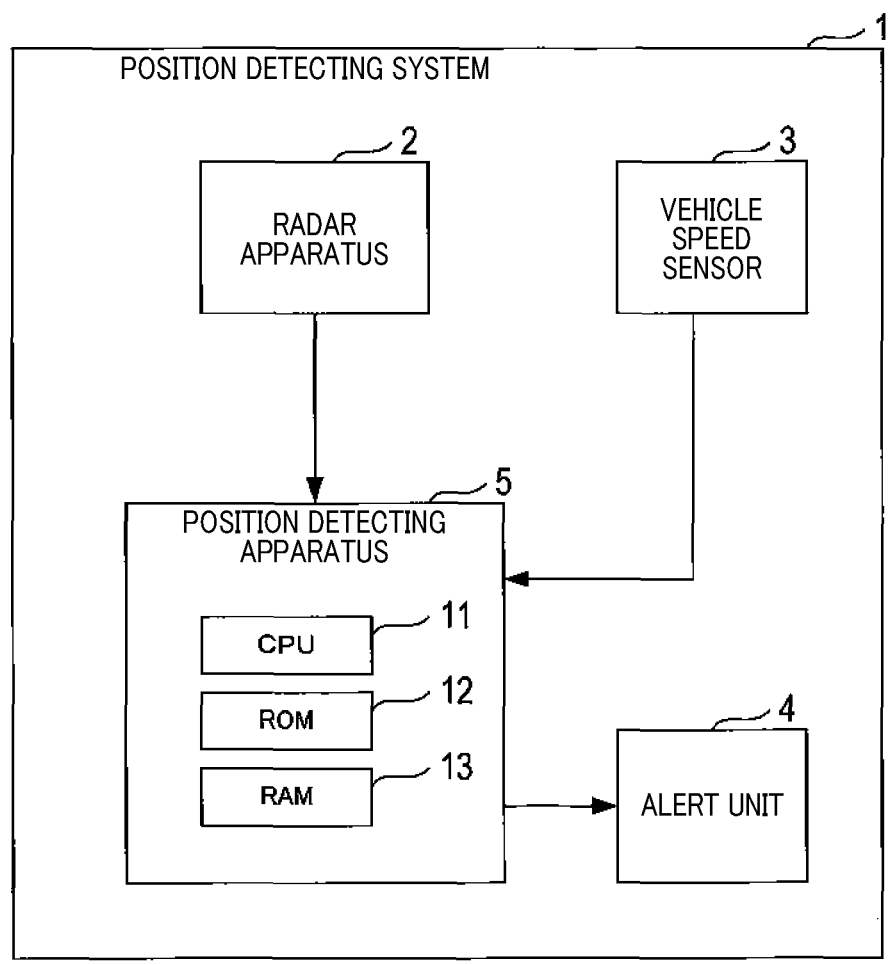
FIG. 1 is a block diagram showing a configuration of position detecting system.
Figure 2:
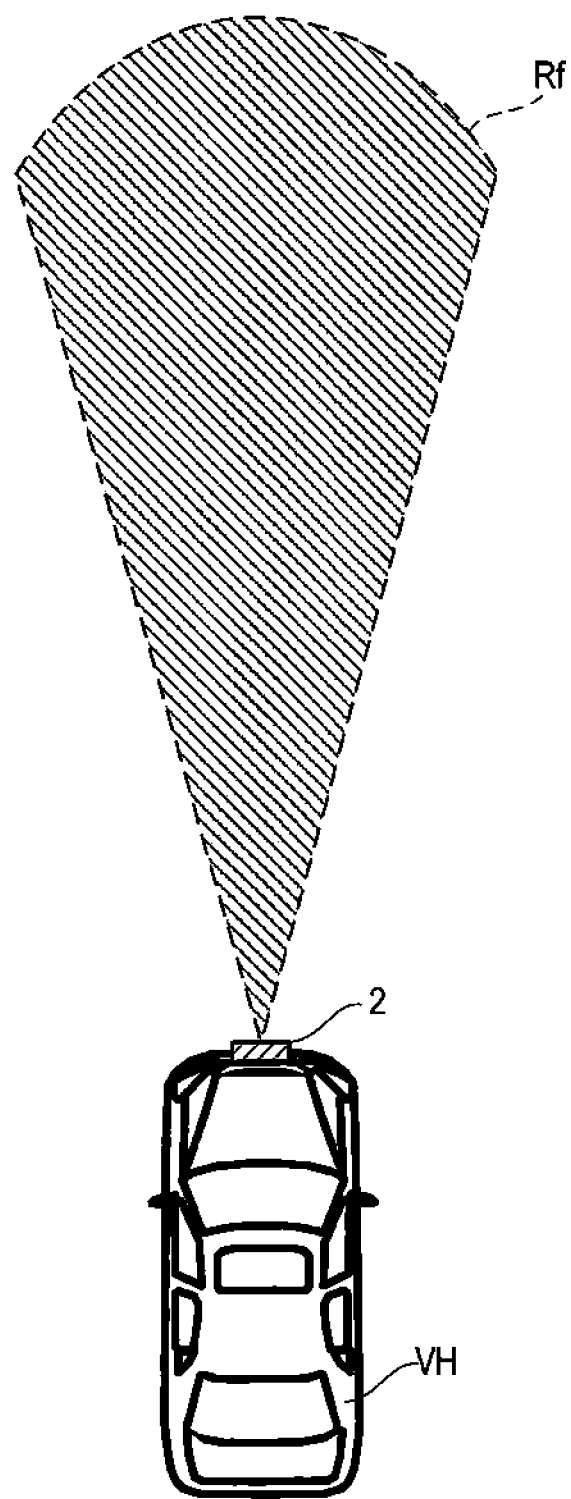
FIG. 2 is a diagram showing a mounting position of a radar apparatus and an object detection region according to a first embodiment.

A position detecting system 1 according the present embodiment is mounted on a vehicle. As shown in FIG. 1, the position detecting system 1 is provided with a radar apparatus 2, a vehicle speed sensor 3, an alert unit 4 and a position detecting apparatus 5.

The radar apparatus 2 is installed in the front side of a vehicle VH provided with the position detecting system 1. The radar apparatus 2 transmits the radar waves ahead of the vehicle VH and receives the reflected radar waves, thereby detecting an object existing in an object detecting region Rf ahead of the vehicle VH.

The radar apparatus 2 utilizes a known FMCW method in which radar waves in the upward conversion section and radar waves in the downward conversion section are alternately transmitted at a predetermined conversion period and the reflected radar waves are received. FMCW is an abbreviation of Frequency Modulated Continuous Wave. According to the FMCW method, the radar apparatus 2 detects, at each modulation period, a distance R to a point which reflects the radar waves (hereinafter referred to as observation point) and a relative speed Vr with respect to the observation point and a horizontal azimuth angle x of the observation point. Further, the radar apparatus 2 outputs observation point information indicating the detected distance R, the relative speed Vr and the horizontal azimuth angle x to the position detecting apparatus 5.

The vehicle speed sensor 3 detects the travelling speed of the vehicle VH (hereinafter referred to as vehicle speed Vn) and outputs the vehicle speed signal indicating the vehicle speed Vn. The alert unit 4 serves as a sound output device provided in the vehicle cabin, and outputs an alert sound to passengers in the vehicle.

As shown in FIG. 1, the position detecting apparatus 5 is an electronic control unit mainly configured of a known microcomputer provided with a CPU 11, a ROM 12, and a RAM 13. Various functions of the microcomputer are accomplished by the CPU 11 executing programs stored in a non-transitory tangible recording media. In this example, the ROM 12 corresponds to the non-transitory tangible recording media which stores the programs. Further, by executing the programs, a method corresponding to the programs is executed. Note that all of or part of functions executed by the CPU 11 may be configured as hardware such as one or more integrated circuits. Moreover, the number of microcomputers constituting the position detecting apparatus 5 may be one or more.

Next, a procedure of the position detecting process executed by the CPU 11 of the position detecting apparatus 5 will be described. The position detecting process is repeatedly executed while the position detecting apparatus 5 is operating.

Figure 3:
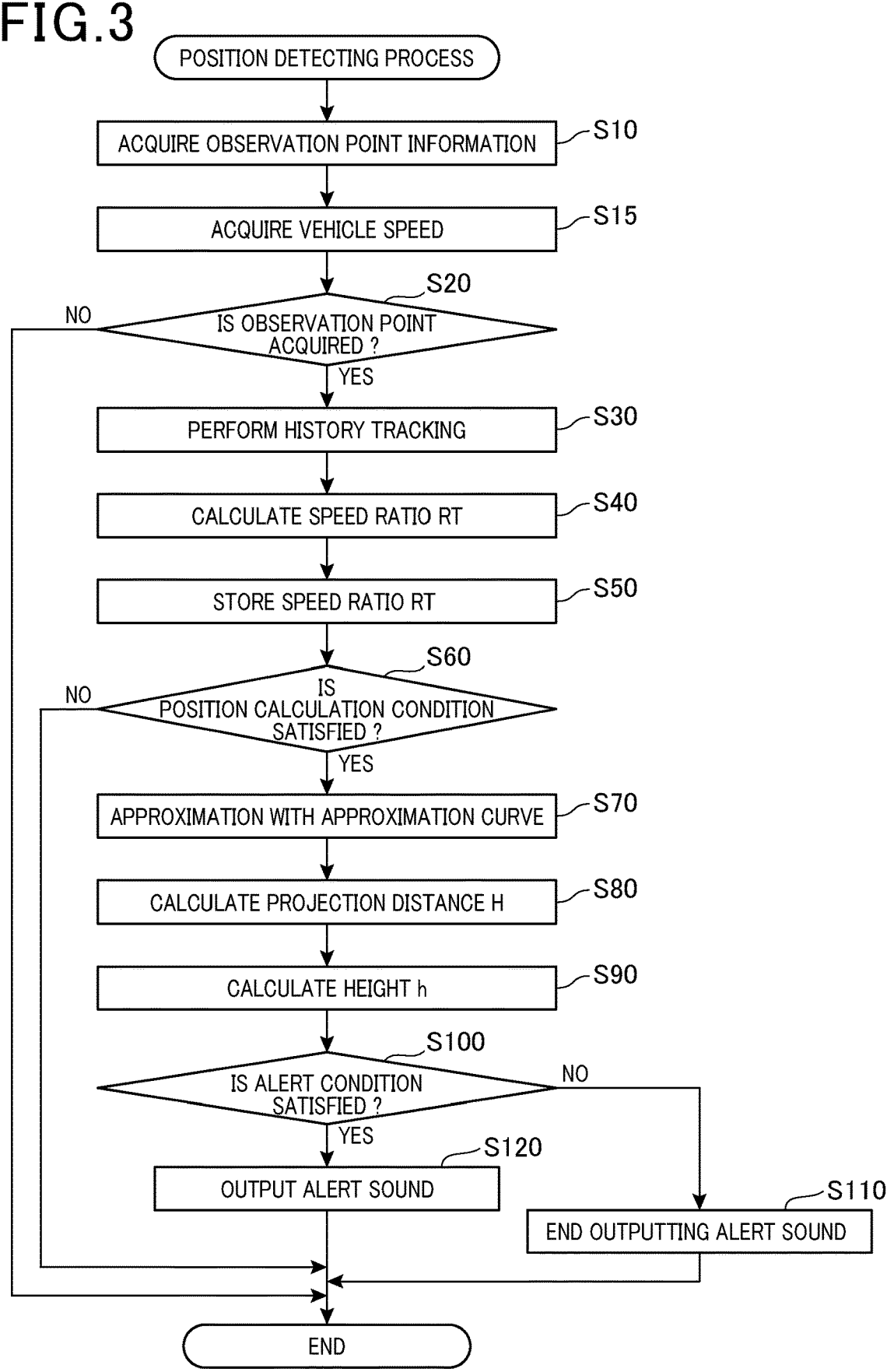
FIG. 3 is a flowchart showing a position detecting process according to the first embodiment.

As shown in FIG. 3, when the position detecting process is executed, the CPU 11 acquires observation point information from the radar apparatus 2 at step S10. Further, at step S15, the CPU 11 acquires the vehicle speed signal from the vehicle speed sensor 3. Then, at step S20, the CPU 11 determines whether new observation point information has been acquired at step S10. Here, in the case where new observation point information has not been acquired, the CPU 11 temporarily terminates the position detecting process. On the other hand, when new observation point information has been acquired, the CPU 11 executes a history tracking process that determines whether the observation point of the currently acquired observation information (hereinafter referred to as current observation point) is an object the same as that of an observation point in the previously acquired observation information (that is, whether history connection is present).

Specifically, the CPU 11 calculates, based on the previously acquired observation information, an estimated position and the estimated speed of the current observation point corresponding to the previous observation point, and determines that the history connection is present when difference between the estimated position/speed and the detection point/speed of the current observation point is each smaller than the upper position difference and the upper speed difference which are set in advance.

Further, at step S40, the CPU 11 calculates the speed ratio RT. Specifically, the CPU 11 calculates a division value, where the relative speed Vr indicated by the observation point information acquired at step S10 is divided by the vehicle speed Vn indicated by the vehicle speed signal acquired at step S15, to be the speed ration RT. Then, at step S50, the CPU 11 correlates the speed ratio RT calculated at S40 with the distance R indicated by the observation information acquired at step S10, and stores the correlated value into the RAM 13 of the position detecting apparatus 5.

Next, at step S60, the CPU 11 determines whether a position calculation condition set in advance is satisfied or not. For example, the position calculation condition according to the present embodiment is that the history connection at step S20 continues for a predetermined number of calculation determinations (5 times according to the present embodiment).

Figure 4:
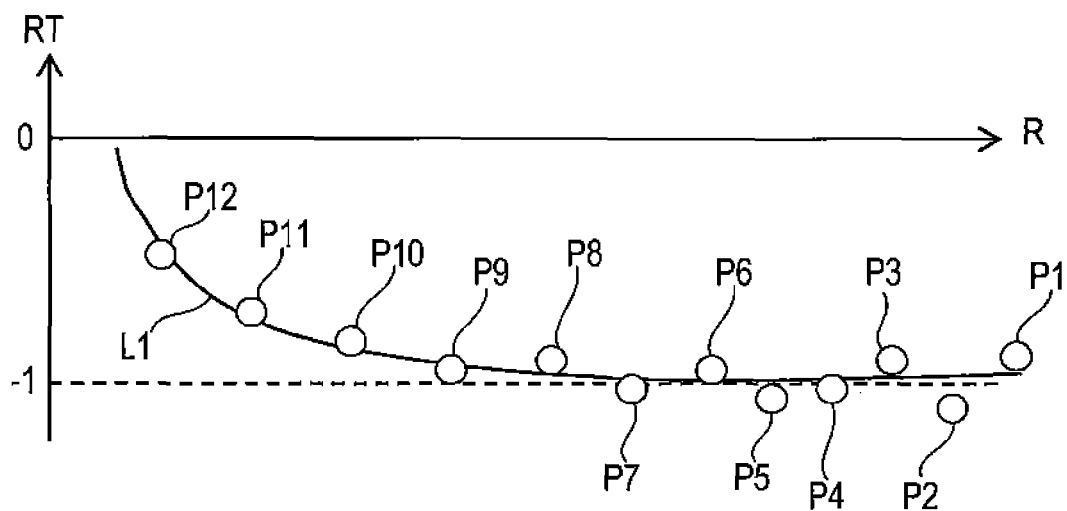
FIG. 4 is an explanatory diagram showing a calculation method for an approximation curve according to the first embodiment.

In the case where the position calculation condition is not satisfied, the CPU 11 temporarily terminates the position detecting process. On the other hand, in the case where the position calculation condition is satisfied, the CPU 11 calculates the approximation line at step S70. Specifically, the CPU 11 generates a graph expressing a relationship between the distance R and the speed ratio RT as shown in FIG. 4, using a plurality of pairs of the speed ratio RT and the distance R where the history connection is present. In FIG. 4, the points P1, P2, P3, P4, P5, P6, P7, P8, P9, P10, P11 and P12 represent a location of a pair of the distance R and the speed ration RT in a two dimensional space defined by the two axis in which the distance R is vertical axis and the speed ration RT is horizontal axis.

Then, the CPU 11 approximates the plurality of points in the generated graph by a curve expressed by $RT = (a/R2) - 1$ to determine a coefficient a. For example, the least square method can be used for determining the coefficient a. The curve L1 shown in FIG. 4 is an approximate line fitted to the points P1 to P12.

When the process of step S70 is ended, as shown in FIG. 3, at step S80, the CPU 11 uses the coefficient a determined at step S70 to calculates a projection distance H which will be described later.

Figure 5:
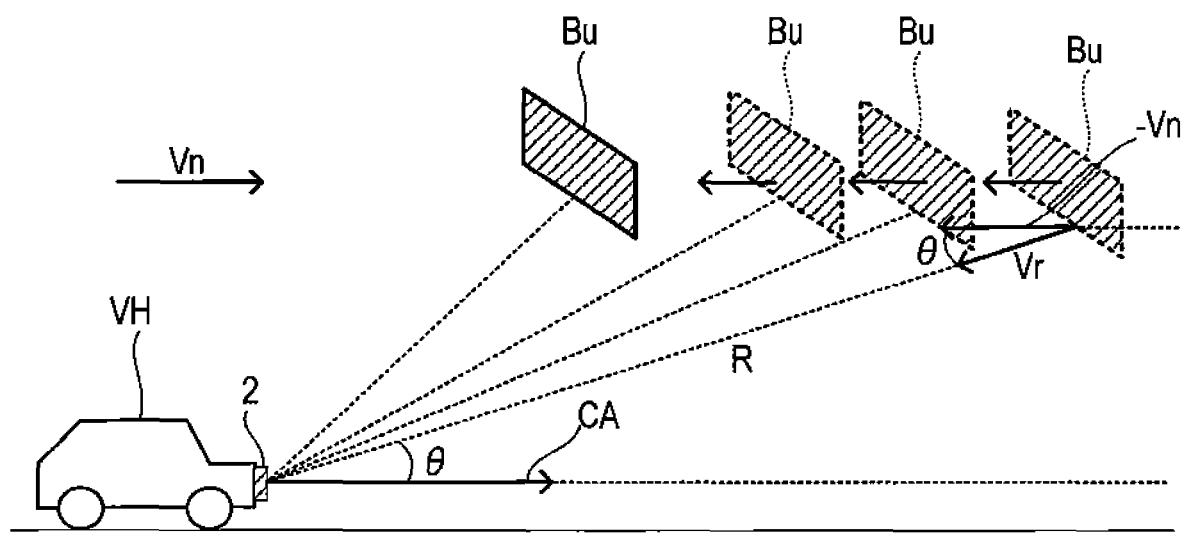
FIG. 5 is a diagram showing a situation in which the vehicle is approaching an upper object.

FIG. 5 shows a case where the vehicle VH traveling at a vehicle speed Vn is approaching an upper object BU such as a guide plate existing in an upper area of the vehicle VH. In FIG. 5, since the vehicle VH is defined as an origin, the upper object BU is illustrated such that the upper object BU gradually approach the vehicle VH.

As shown in FIG. 5, the relative speed Vr is expressed with the following equation (1) by using an elevation angle θ of the upper object Bu with respect to a center axis CA showing a direction where the radar apparatus 2 transmits the radar waves. Then, the following equation (1) is utilized to obtain the equation (2). Note that the radar apparatus 2 is provided in the front side of the vehicle VH such that the center axis CA is in parallel to the travelling direction of the vehicle VH.

$$Vr = -Vn \times \cos\theta \quad (1)$$

$$Vr/Vn = -\{1-(\sin\theta)2\}1/2 \quad (2)$$

In the case where the elevation angle θ is sufficiently smaller than 1, Vr/Vn can be approximated by the following equation (3).

$$Vr/Vn \approx -(1-\theta2)1/2 \quad (3)$$

Further, Taylor expansion may be applied with the elevation angle θ, whereby the equation Vr/Vn can be approximated by the following equation (4).

$$Vr/Vn \approx -(1-\theta2/2) \quad (4)$$

Figure 6:
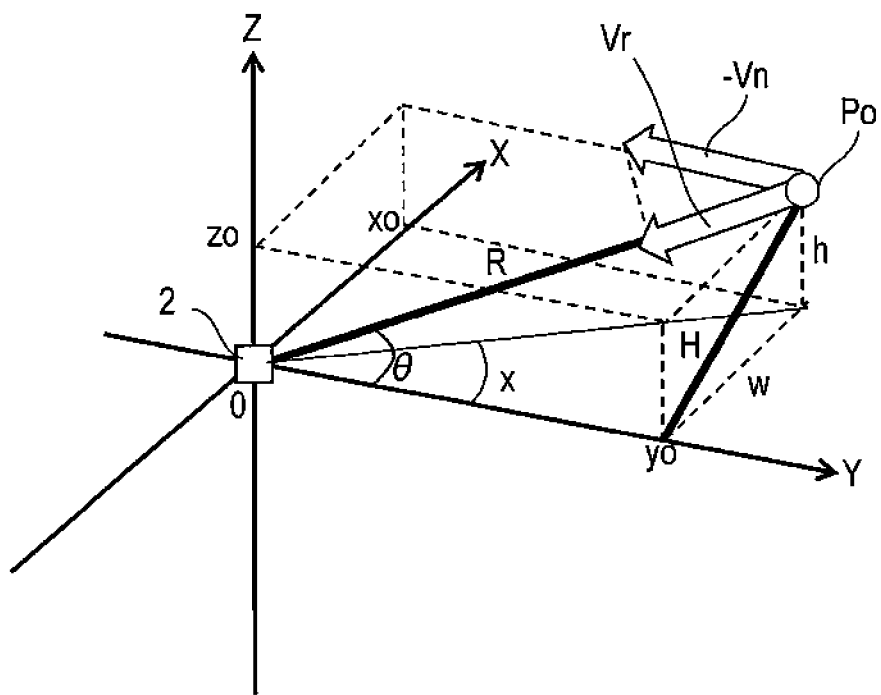
FIG. 6 is diagram showing a calculation method of a projection distance.

As shown in FIG. 6, it is assumed that the radar apparatus 2 is positioned at the origin in a three dimensional space defined by the X axis as a vehicle width direction of the vehicle VH, the Y axis as a direction of the center axis CA, and the Z axis perpendicular to the X axis and the Y axis. In this case, the distance between the observation point Po and the Y axis is defined as the projection distance H. The projection distance H corresponds to a distance between the observation point Po projected on the XZ plane and the position of the radar 2 (i.e. origin) when the observation point Po is projected on the XZ plane including the X axis and the Z axis.

Then, the equation Vr/Vn can be approximated as shown in the following equation (5) using the distance R and the projection distance H.

$$Vr/Vn \approx -\{1(H/R)2/2\} \quad (5)$$

The projection distance H is expressed by the following equation (6), when comparing the approximation curve expressed by RT=(a/R2)−1 with the equation (5).

$$H \approx (2a)1/2 \quad (6)$$

In other words, at step S80, the CPU 11 calculates the projection distance H using the equation (6).

When the process at step S80 is completed, the CPU 11 calculates the height h at step S90 as shown in FIG. 3. Specifically, the CPU 11 calculates a vehicle width direction distance w. As shown in FIG. 6, assuming that the position of the observation point Po in the three dimensional coordinate is (xo, yo, zo), the Y coordinate position Yo is expressed by the following equation (7).

$$yo=(R2-H2)1/2 \quad (7)$$

The vehicle width direction distance w equals to the X coordinate position xo. Therefore, the vehicle width direction distance w is calculated with the equation (8) by using the horizontal azimuth angle x of the observation point.

$$w=xo=\tan(x)\times(R2-H2)1/2 \quad (8)$$

The height h equals to Z coordinate position zo. Hence, at step S90, the CPU 11 uses the calculated vehicle width direction distance w to calculate the height h by the equation (9).

$$h=zo=(H2-w2)1/2 \quad (9)$$

When completing the process at step S90, the CPU 11 determines, at step S100, whether a predetermined alert condition is satisfied. The alert condition according to the present embodiment is a condition which satisfies all the following first, second and third conditions. The first condition is that the horizontal azimuth angle x indicated by the observation point information acquired at step S10 is less than a predetermined alert determination angle. The second condition is that the distance R indicated by the observation information acquired at step S10 is less than a predetermined alert determination distance. The third condition is that the height h calculated at step S90 is less than or equal to a predetermined alert determination height (e.g. 2 meters according to the present embodiment).

Here, in the case where the alert conditions are not satisfied, the CPU 11 terminates the alert sound outputted by the alert unit 4 and temporarily terminates the position determination process. Thus, in the case where the alert unit 4 is outputting the alert sound, the alert output is suspended, and in the case where the alert unit 4 is not outputting the alert sound, the state of outputting no alert sound is maintained.

On the other hand, when an alert condition is satisfied, at step S120, the CPU 11 controls the alert unit 4 to output an alert sound and temporarily terminates the position detecting process. Thus, in the case where the alert unit 4 is outputting an alert sound, the state of outputting alert sound is maintained, and in the case where the alert unit 4 is not outputting an alert sound, the alert sound is outputted.

The position detecting apparatus 5 thus configured repeatedly acquires, from the radar apparatus 2, the observation information including at least the distance R between the radar apparatus 2 and the observation point, and the relative speed Vr between the radar apparatus 2 and the observation point. The radar apparatus 2 is mounted on the vehicle VH and receives reflected waves of the radar waves transmitted outside the vehicle VH, thereby detecting an object that reflected the radar waves (hereinafter referred to as reflecting object).

The position detecting apparatus 5 repeatedly acquires the vehicle speed signal indicating the vehicle speed Vn. The position detecting apparatus 5 calculates the speed ratio RT which is a ratio between the relative speed Vr indicated by the acquired observation point information and the vehicle speed Vn indicated by the acquired vehicle speed signal Vn.

The position detecting apparatus 5 calculates, based on the speed ratio RT, a projection distance H between a projected position of the reflecting object and the position of the radar apparatus 2 on the XZ plane, on which the reflecting object is projected and the radar apparatus 2 is present, the XZ plane being perpendicular to the center axis CA indicating a direction along which the radar waves are transmitted by the radar apparatus 2. The position detecting apparatus 5 calculates the position of the reflecting object based on the calculated projection distance H.

Thus, the position detecting apparatus 5 detects the relative speed Vr and the vehicle speed Vn between the radar apparatus 2 and the reflecting object, whereby the position of the reflation object can be calculated. Hence, the position detecting apparatus 5 is not required to measure reference data for calculating the position of the reflection body, and the workload for implementing the position detection function and also an amount of memory data can be reduced.

Further, the position detecting apparatus 5 utilizes the acquired plurality of observation information and the acquired plurality of vehicle speed signals, thereby calculating a plurality of speed ratio RT. Then, the position detecting apparatus 5 utilizes the distance R indicated by the acquired plurality of observation point information and the calculated plurality of speed ratio RT, to thereby calculate the projection distance H with a change in the speed ration RT with respect to the distance.

Thus, since the position detecting apparatus 5 calculates the projection distance H using a plurality of speed ratio RT, the calculation result of the projection distance H can be prevented from being influenced by fluctuation in the calculation result of a plurality of speed ratio RT. Hence, calculation accuracy of the projection distance H can be improved.

The position detecting apparatus 5 calculates, based on the calculated projection distance H and the distance R indicated by the observation point information, the Y coordinate position yo which is a position of the reflecting object with respect to the center axis CA of the radar apparatus 2. Also, the position detecting apparatus 5 calculates, based on the horizontal azimuth angle x indicated by the observation point information and the Y coordinate position yo, the X coordinate position xo which is a position of the reflecting object with respect to the horizontal direction orthogonal to the center axis CA. The position detecting apparatus 5 calculates, based on the projection H and the X coordinate position xo, the Z coordinate position zo which is a position of the reflecting object with respect to the vertical direction orthogonal to the center axis CA and the horizontal direction.

Further, the position detecting apparatus 5 does not calculate the position of the reflecting object in the case where the number of performed history connections is less than a calculation determination number set in advance. Thus, the position detecting apparatus 5 is able to calculate the projection H using the speed ratio RT where the number of history connections is larger than or equal to the calculation determination number. Hence, the calculation accuracy of the projection H can be improved. Furthermore, the position detecting apparatus 5 is able to calculate the position of the reflecting object when the number of history connection is larger than or equal to the calculation determination number. Accordingly, a calculation load of the position detecting apparatus 5 can be reduced.

The position detecting apparatus 5 determines whether the vehicle VH collide with the reflecting object based on the position of the calculated reflecting object. Thus, the position detecting apparatus 5 is able to notify the driver of the vehicle VH of possible collision between the vehicle VH and the reflecting object when determining that the vehicle VH will collide with the reflecting object. Hence, the reliability of collision avoidance between the vehicle VH and the reflecting objection can be enhanced.

In the above-described embodiments described above, step S10 corresponds to a process of an object information acquiring unit, step S15 corresponds to a process of a travelling speed information acquiring unit, step S40 corresponds to a process of a speed ratio calculation unit, steps S60, S70 and S80 correspond to processes of projection distance calculation unit, and steps S60 and S90 correspond to processes of the position calculation unit.

The vehicle VH corresponds to a mobile body, the distance R corresponds to object distance, and the object pint information corresponds to object information, the vehicle speed signal corresponds to travelling speed information and XZ plane corresponds to a projection plane.

Also, the Y coordinate position yo corresponds to center axis direction position, the X coordinate position xo corresponds to horizontal direction position, the Z coordinate position zo corresponds to vertical direction position, the number of history connections corresponds to continuous detection number and step S100 corresponds to a process as a collision determination unit.

Second Embodiment

Hereinafter, with reference to the drawings, a second embodiment according to the present disclosure will be described. According to the second embodiment, portions differing from those in the first embodiment will be descried. The same reference numbers are applied to common configurations.

The position detecting system 1 according to the second embodiment differs from the first embodiment in that the position detecting process is changed.

Figure 7:
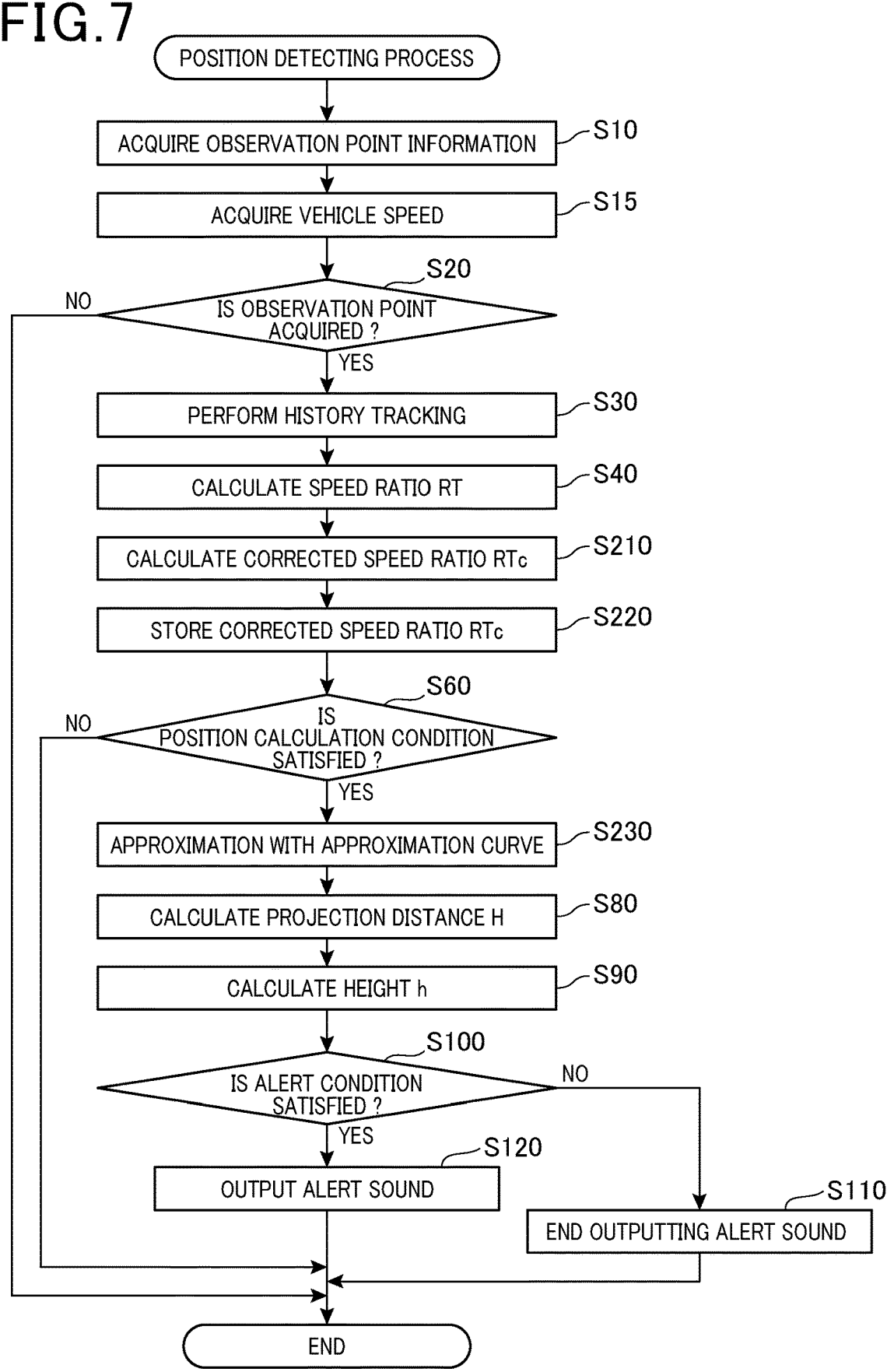
FIG. 7 is a flowchart showing a position detecting process according to a second embodiment.

The position detecting process according to the second embodiment differs from the first embodiment in that processes at steps S210, S220 and S230 are executed instead of steps S50 and S70. Specifically, as shown in FIG. 7, when the process at step S40 is completed, at step S210, the CPU 11 uses the horizontal azimuth angle x indicated by the observation point information acquired at step S10 to calculate a corrected speed ratio RTc in accordance with the equation (10).

$$RTc = RT \times \cos(x) \quad (10)$$

Then, at step S220, the CPU 11 correlates the corrected speed ratio RTc calculated at step S210 with the distance R indicated by the observation point information acquired at step S10, and stores them into the RAM 13 of the position detecting apparatus 5.

At step S60, in the case where the position calculation position is satisfied, the process calculates an approximation line at step S230 and proceeds to step S80. Specifically, the CPU 11 generates a graph expressing a correlation between the distance R and the corrected speed ratio RTc by using a plurality of pairs of the distance R and the corrected speed ratio RTc where a history connection is present. Then, the CPU 11 approximates the plurality of points in the generated graph by a curve expressed by $RTc = (a/R2) - 1$, thereby detecting the coefficient a.

The position detecting apparatus 5 thus configured corrects the speed ratio RT depending on the horizontal azimuth angle x, whereby the speed ratio RT can be prevented from being influenced. Hence, the detection accuracy of the projection distance H can be further improved.

Third Embodiment

With reference to the drawings, a third embodiment of the present disclosure will be described. According to the third embodiment, portions differing from those in the first embodiment will be descried. The same reference numbers are applied to common configurations.

The position detection system 1 of the third embodiment differs from the first embodiment in that an arrangement of the radar apparatus 2 and the position detecting process is changed.

Figure 8:
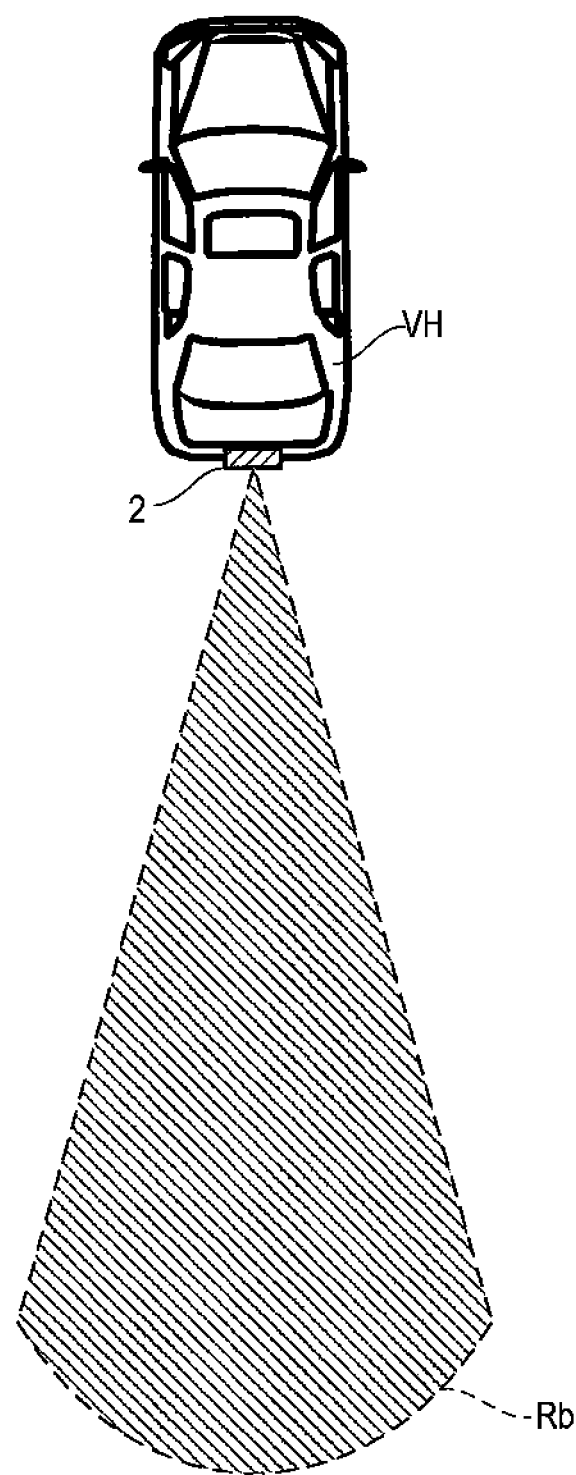
FIG. 8 is a diagram showing a mounting position of a radar apparatus and an object detection region according to a third embodiment.

Firstly, the radar apparatus 2 according to the third embodiment is mounted in the rear side of the vehicle VH as shown in FIG. 8. The radar apparatus 2 transmits the radar waves towards rear side of the vehicle VH and receives the reflected radar waves, thereby detecting an object existing within an object detection region Rb in the rear side of the vehicle VH.

Next, the position detecting process according to the third embodiment differs from the first embodiment in that a process at step S310 is executed instead of step S70.

Figure 9:
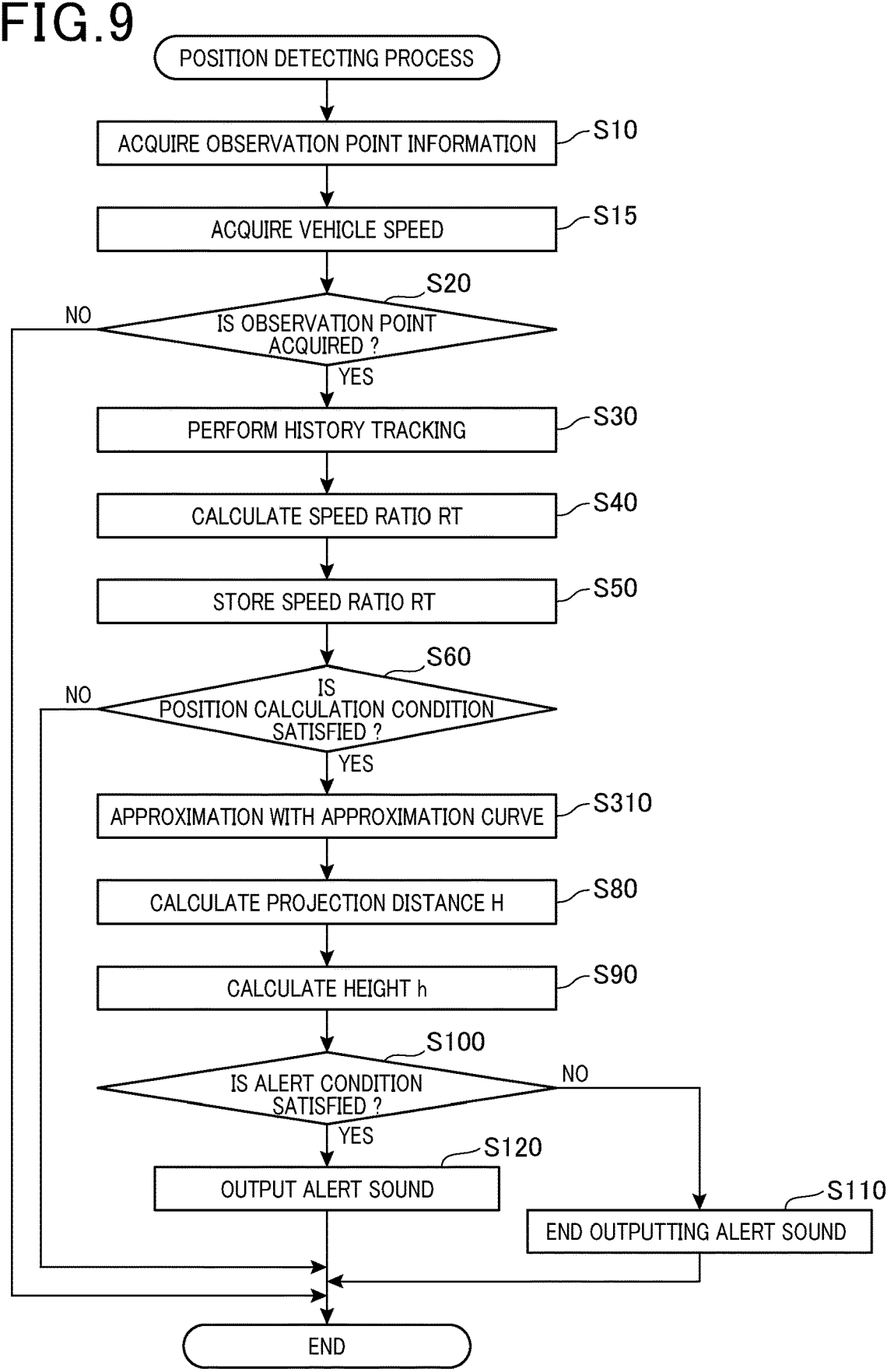
FIG. 9 is a flowchart showing a position detecting process according to the third embodiment.
Figure 10:
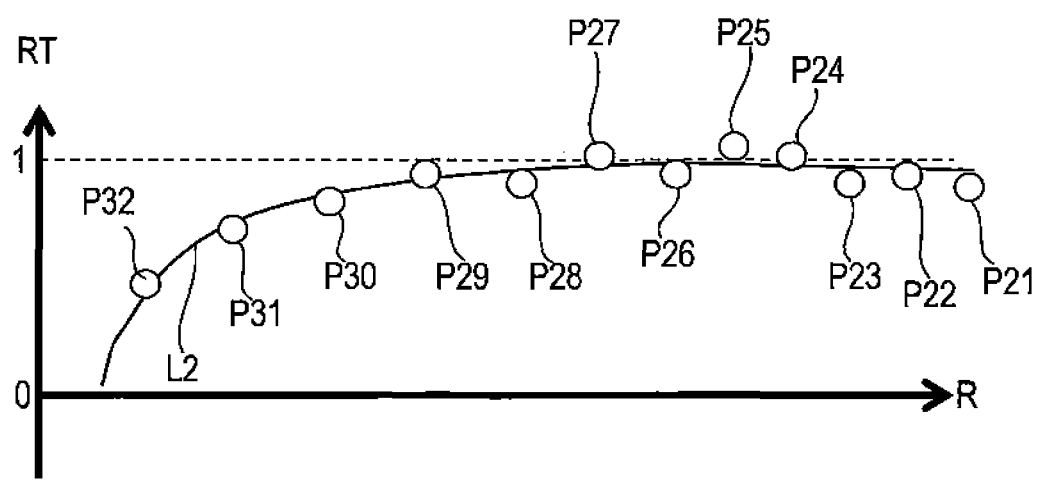
FIG. 10 is an explanatory diagram showing a calculation method for an approximation curve according to the first embodiment.

That is, as shown in FIG. 9, when the position calculation condition is met at step S60, the CPU 11 calculates an approximation line at step S310 and proceeds to step S80. Specifically, the CPU 11 generates, as shown in FIG. 10, a graph expressing a correlation between the distance R and the corrected speed ratio RT by using a plurality of pairs of corrected speed ratio RT and the distance R where a history connection is present in each pair. The points P21, P22, p23, P24, P25, P26, P27, P28, P29, P30, P31 and P32 shown in FIG. 10 each indicate a position of the pair of the distance R and the speed ratio RT in the two dimensional space defined by the two axes where the horizontal axis is distance R and the vertical axis is the speed ratio RT.

Then, the CPU 11 approximates the plurality of points in the generated graph by a curve expressed by $RT = (-a/R2) + 1$ to determine a coefficient a. For example, the least square method can be used for determining the coefficient a. The curve L2 shown in FIG. 10 is an approximate line of the points P21 to P32.

The position detecting apparatus 5 thus configured calculates the plurality of speed ratio RT by using the acquired plurality of observation point information and the acquired plurality of vehicle speed signals. Then, the position detecting apparatus 5 calculates the projection distance H in accordance with a change in the speed ratio RT with respect to the distance R by using the distance R indicated by the acquired plurality of observation point information and the calculated plurality of speed ratio RT.

Thus, since the position detecting apparatus 5 calculates the projection distance H using a plurality of speed ratio RT, the calculation result of the projection distance H can be prevented from being influenced by fluctuation of a plurality of speed ratios RT. Hence, calculation accuracy of the projection distance H can be improved.

In the above-described embodiments, steps S60, S310 and S80 correspond to processes of projection distance calculation unit.

Embodiments of the present disclosure are described so far. However, the present disclosure is not limited to the above-described embodiments, but may be modified in various manners.

[Modification 1]

For example, according to the above-described embodiments, a configuration in which the radar apparatus 2 transmits the radar waves towards a front side or a rear side of the vehicle VH is described. However, the transmission direction of the radar waves is not limited to the front side or the rear side of the vehicle VH. For example, the radar apparatus 2 may transmit the radar waves towards at least one of front side, front right side, front left side, rear side, rear right side, rear left side, laterally right side and laterally left side.

[Modification 2]

According to the above-described embodiments, the radar apparatus 2 configured as a FMCW-type radar apparatus is exemplified. However, the type pf radar apparatus is not limited to FMCW. For example, 2 frequency CW, FCW or a pulse type radar apparatus may be utilized. Note that FCW is abbreviation of fast-chirp modulation.

[Modification 3]

According to the above-described embodiments, a configuration is exemplified that the position detecting apparatus 5 executes the position detecting process. However, the radar apparatus 2 may execute the position detecting process.

[Modification 4]

Figure 11:
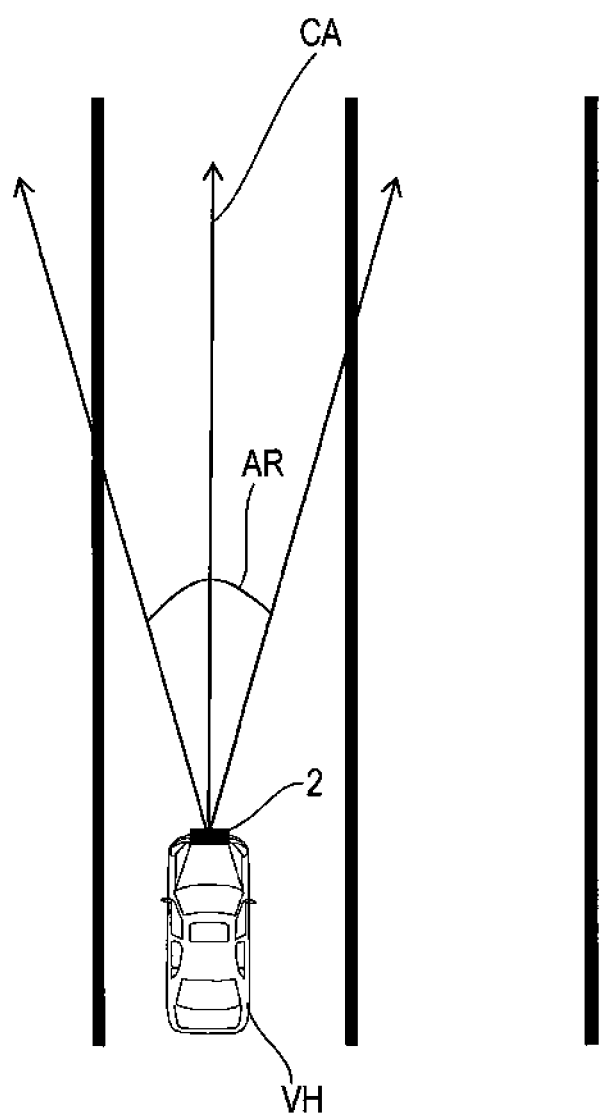
FIG. 11 is a diagram showing a horizontal azimuth angle range when transmitting radar waves ahead the vehicle.
Figure 12:
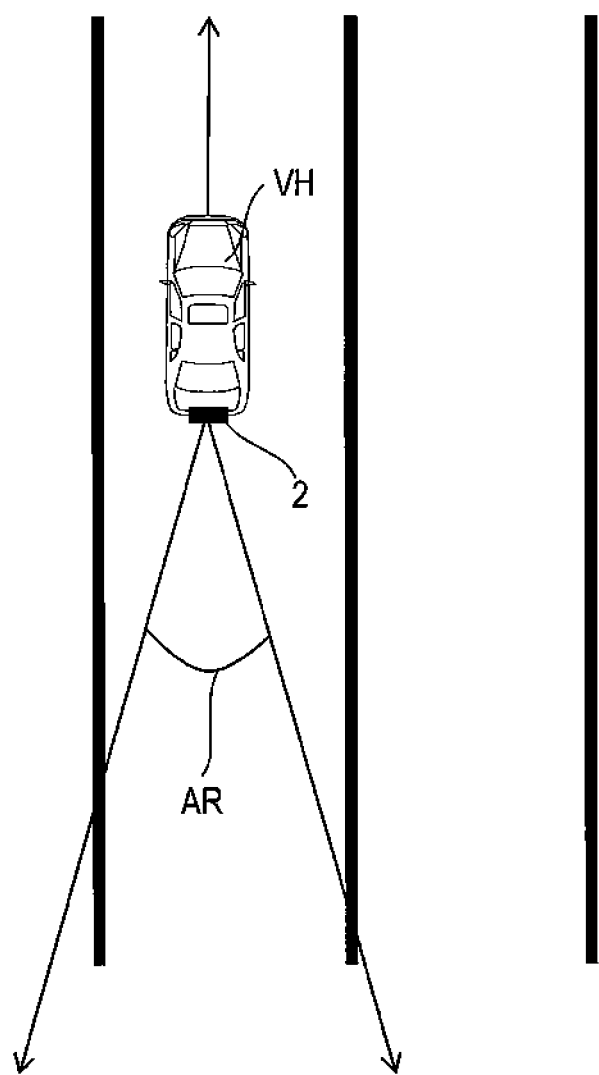
FIG. 12 is a diagram showing a horizontal azimuth angle range when transmitting radar waves behind the vehicle.

According to the above-described embodiments, the position calculation condition is exemplified as a condition where the history connection at step S20 continues for a predetermined calculation determination number. However, as shown in FIG. 11, the position calculation condition may be set such that the horizontal azimuth angle x of the detected observation points is within a predetermined horizontal azimuth direction angle range AR including the horizontal azimuth angle corresponding to the travelling direction of the vehicle VH. For example, the horizontal azimuth angle range AR ranges from −10° to +10°. Also, even in a case where the radar apparatus 2 transmits the radar waves towards rear side of the vehicle VH, as shown in FIG. 12, the position calculation condition may be set such that the horizontal azimuth angle x of the detected observation points is within the horizontal azimuth angle range AR.

The position detecting apparatus 5 thus configured does not calculate the position of the reflecting object in the case where the horizontal azimuth angle x indicated by the observation point information is not included within the predetermined horizontal azimuth angle range AR including the horizontal azimuth direction angle x corresponding to the travelling direction of the vehicle VH. Thus, the position detecting apparatus 5 is able to calculate, based on the horizontal azimuth angle x, the position of the reflecting object, when the position of the reflecting object is required to be calculated. Hence, a calculation load of the position detecting apparatus 5 can be reduced. Further, since the position detecting apparatus 5 does not calculate the position of the reflecting objection when the horizontal azimuth angle x is large, a calculation accuracy of the position of the reflecting object can be improved.

[Modification 5]

Figure 13:
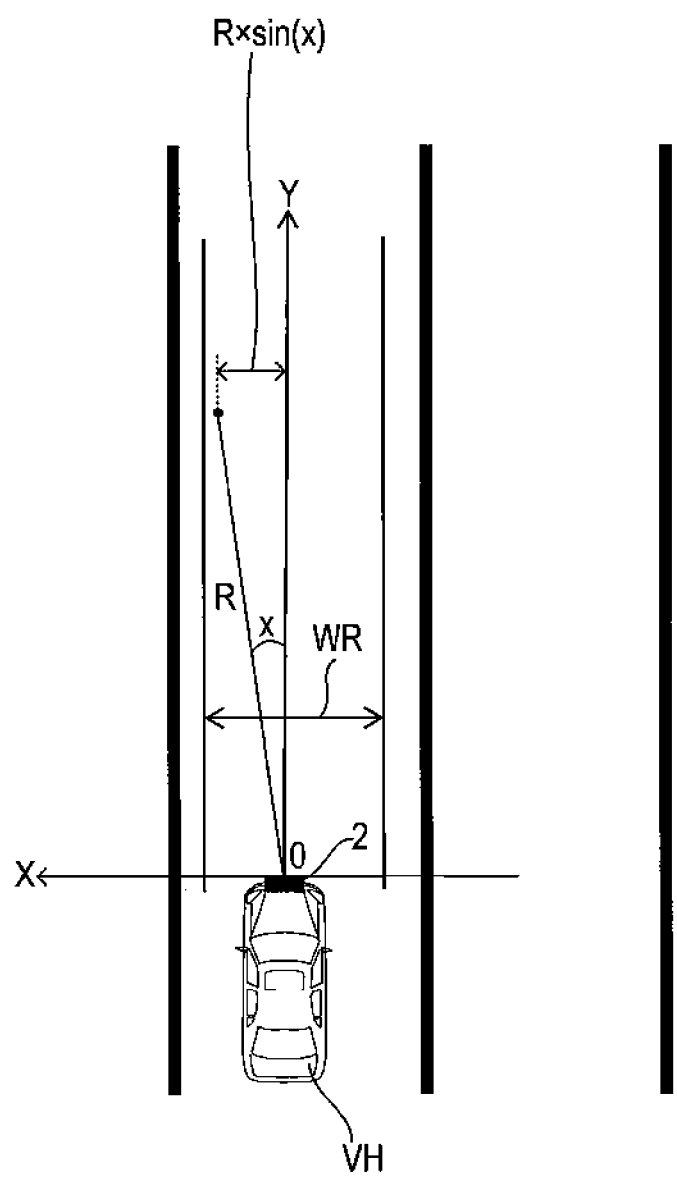
FIG. 13 is a diagram showing a width direction range when transmitting radar waves ahead the vehicle.
Figure 14:
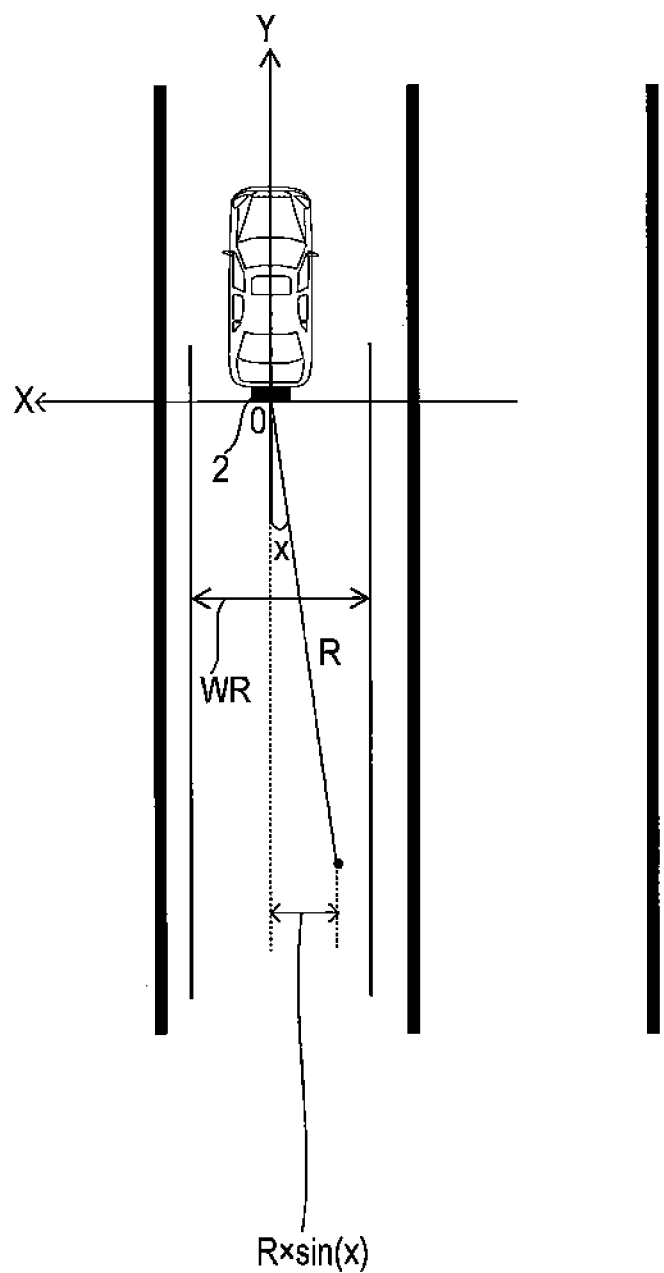
FIG. 14 is a diagram showing a width direction range when transmitting radar waves behind the vehicle.

According to the above-described embodiments, the position calculation condition is exemplified as a condition where the history connection at step S20 continues for a predetermined calculation determination number. However, in the case where the radar apparatus 2 is mounted in the front side of the vehicle VH and transmits the radar waves ahead of the vehicle VH, as shown in FIG. 13, the position calculation condition may be set such that the estimated X coordinate position calculated in accordance with a function of R×sin (X) using the distance R and the horizontal azimuth angle x is within a predetermined width direction range WR. The width direction range WR may be in a range from −W/2 [m] to +W/2 [m], where W is a width of the vehicle VH. Also, as shown in FIG. 14, in the case where the radar apparatus 2 transmits the radar waves towards rear side of the vehicle VH, the position calculation condition may be set such that the estimated X coordinate position is within the width direction range WR.

The position detecting apparatus 5 thus configured does not calculate the position of the reflecting object in the case where the estimated X coordinate position calculated in accordance with the distance R and the horizontal azimuth x indicated by the observation point information is not included within the predetermined width direction range WR including the vehicle VH. Thus, the position detecting apparatus 5 is able to calculate, based on the distance R and the horizontal azimuth angle x, the position of the reflecting object, when the position of the reflecting object is required to be calculated. Hence, a calculation load of the position detecting apparatus 5 can be reduced. Note that the estimated X coordinate position corresponds to estimated horizontal direction position. Further, the position detecting apparatus 5 can be configured not to calculate the position of the reflecting object when the horizontal azimuth direction angle x is large. Hence, the calculation accuracy of the position of the reflecting object can be improved.

[Modification 6]

According to the above-described embodiments, the position calculation condition is exemplified as a condition where the history connection at step S20 continues for a predetermined calculation determination number. However, a tracking distance may be defined as a distance between an observation point detected earliest and an observation point detected latest among the plurality of observation points having the history connection, and the position calculation condition may be set to be longer than or equal to a calculation determination tracking distance (e.g. 5 meter to 10 meter) in which the tracking distance is set in advance.

The position detecting apparatus 5 thus configured, in the case where the radar apparatus 2 continuously detects the reflecting object, does not calculate the position of the reflecting object when the tracking distance as a distance between an observation point detected earliest and an observation point detected latest is less than a predetermined calculation determination tracking distance. Thus, the position detecting apparatus 5 is able to calculate the projection distance H using a plurality of speed ratio RT. Hence, the calculation accuracy of the projection distance H can be improved. Moreover, the position detecting apparatus 5 is able to calculate the position of the reflecting object when the tracking distance is longer than or equal to the calculation determination tracking distance. Hence, the calculation load of the position detecting apparatus 5 can be reduced.

[Modification 7]

According to the above-described embodiments, the position calculation condition is exemplified as a condition where the history connection at step S20 continues for a predetermined calculation determination number. However, the position calculation condition may be set to be less than or equal to a calculation determination distance (e.g. 20 m) where the distance R of the observation points is set in advance.

The position detecting apparatus 5 thus configured, in the case where the distance R indicated by the observation point information is longer than the calculation determination distance, does not calculate the position of the reflecting object. Thus, the position detecting apparatus 5 is able to calculate, based on the distance R, the position of the reflecting object, when the position of the reflecting object is required to be calculated. Hence, a calculation load of the position detecting apparatus 5 can be reduced. Further, the position detecting apparatus 5 can be configured not to calculate the position of the reflecting object when the distance to the reflecting object is large. Hence, the calculation accuracy of the position of the reflecting object can be improved.

[Modification 8]

According to the above-described embodiments, the position calculation condition is exemplified as a condition where the history connection at step S20 continues for a predetermined calculation determination number. However, the position calculation condition may be set based on information such as a vehicle speed, a steering angle and an acceleration with respect to the back and forth direction and the left and right direction. For example, the position calculation condition may be set as a condition in which the vehicle speed is less than or equal to a predetermined calculation determination vehicle speed. Further, the position calculation condition may be set as a condition in which the steering angle is within a predetermined calculated determination steering angle range. Moreover, the position calculation condition may be set as a condition in which at least one of a front acceleration, a rear acceleration, a left acceleration and a right acceleration is less than or equal to a predetermined calculated determination acceleration.

The position detecting apparatus 5 thus configured determines, based on at least one of the vehicle speed, the steering angle, the front acceleration, the rear acceleration, the left acceleration and the right acceleration of the vehicle VH, whether the position of the reflecting object is to be calculated or not. Thus, the position detecting apparatus 5 is able to calculate, based on at least one of the vehicle speed, the steering angle, the front acceleration, the rear acceleration, the left acceleration and the right acceleration of the vehicle VH, the position of the reflecting object, when the position of the reflecting object is required to be calculated. Hence, a calculation load of the position detecting apparatus 5 can be reduced.

[Modification 9]

According to the above-described embodiments, the coefficient a is determined by an approximation using an approximation curve expressed by an equation $Vr/Vn=(a/R^2)-1$. However, the approximation curve is not limited to the equation $Vr/Vn=(a/R^2)-1$. For example, an approximation curve expressed by $(Vr-Vn)/Vn=(a/R^2)-2$ may be used for the approximation. Moreover, another approximation curve expressed by $1/(Vn/Vr)=(a/R^2)-1$ may be used for the approximation.

It should be noted that a function included in a single element in the above-described embodiments may be shared by a plurality of elements, or a single element may have a function which is shared by a plurality of elements. Further, a part of the configurations in the above-described embodiments may be omitted. Also, at least a part of the configurations in the above-described embodiments may be added to or may replace other configurations in the above described embodiments.

The present disclosure may be embodied by various manners other than the above-described position detecting apparatus 5, such as a system including the position detecting apparatus 5 as an element thereof, a program for functioning computer as the position detecting apparatus 5, a recording media storing the program, a position detection method and the like.

CONCLUSION

The present disclosure reduces the workload for implementing a position detecting function and reduces an amount of memory data required.

One aspect of the present disclosure is a position detecting apparatus provided with an object information acquiring unit, a travelling speed information acquiring unit, a speed ratio calculation unit, a projection distance calculation unit and a position calculation unit.

The object information acquiring unit is configured to repeatedly acquire, from a radar apparatus, object information including at least an object distance as a distance between the radar apparatus and a reflection reflecting object and a relative speed between the radar apparatus and a reflecting object. The radar apparatus is mounted on a mobile body, transmitting radar waves towards outside the mobile body and receiving reflected waves of the radar waves, thereby detecting a reflecting object as an object that reflects the radar waves.

The travelling speed information acquiring unit is configured to repeatedly acquire traveling speed information indicating a travelling speed of the mobile body. The speed ratio calculation unit is configured to calculate a speed ratio as a ratio between the relative speed indicated by the object information acquired by the object information acquiring unit and the travelling speed indicated by the travelling speed information acquired by the travelling speed information acquiring unit.

The projection distance calculation unit is configured to calculate, based on the speed ratio calculated by the speed ratio calculation unit, a projection distance between a projected position of the reflecting object projected onto a projection plane and a position of the radar apparatus on the projection plane, the projection plane having a predetermined angle with respect to a center axis indicating a direction along which the radar waves are transmitted by the radar apparatus and including the radar apparatus. The position calculation unit is configured to calculate a position of the reflecting object based on the projection distance calculated by the projection distance calculation unit.

The position detecting apparatus of the present disclosure thus configured detects the relative speed between the radar apparatus and the reflecting object, and the travelling speed of the mobile body, thereby calculating the position of the reflecting object. Therefore, the position detecting apparatus of the present disclosure is not required to measure, in advance, reference data to be referred to for calculating the reflecting object. Hence, the workload for implementing the position detection function can be reduced and also an amount of memory data required can be reduced.

What is claimed is:

1. A position detecting apparatus comprising:
an object information acquiring unit mounted on a mobile body, configured to repeatedly acquire, from a radar apparatus that transmits radar waves towards outside the mobile body and receives reflected waves of the radar waves thereby detecting a reflecting object as an object that reflects the radar waves, object information including at least an object distance as a distance between the radar apparatus and the reflecting object and a relative speed between the radar apparatus and the reflecting object;

a travelling speed information acquiring unit configured to repeatedly acquire traveling speed information indicating a travelling speed of the mobile body;

a speed ratio calculation unit configured to calculate a speed ratio as a ratio between the relative speed indicated by the object information acquired by the object information acquiring unit and the travelling speed indicated by the travelling speed information acquired by the travelling speed information acquiring unit;

a projection distance calculation unit configured to calculate, based on the speed ratio calculated by the speed ratio calculation unit, a projection distance between a projected position of the reflecting object projected onto a projection plane and a position of the radar apparatus on the projection plane, the projection plane having a predetermined angle with respect to a center axis indicating a direction along which the radar waves are transmitted by the radar apparatus and including the radar apparatus; and a position calculation unit configured to calculate a position of the reflecting object based on the projection distance calculated by the projection distance calculation unit.

2. The position detecting apparatus according to claim 1, wherein
the speed ratio calculation unit calculates a plurality of the speed ratios by using a plurality of the object information acquired by the object information acquiring unit and a plurality of the travelling speed information acquired by the travelling speed information acquiring unit; and
the projection distance calculation unit calculates the projection distance in accordance with a change in the speed ratio with respect to the object distance by using the object distance indicated by the object information acquired by the object information acquiring unit and a plurality of the speed ratios calculated by the speed ratio calculation unit.

3. The position detecting apparatus according to claim 1, wherein
the object information further includes a horizontal azimuth angle in which the reflecting object is present;
the position calculation unit calculates, based on the projection distance calculated by the projection distance calculation unit and the object distance indicated by the object information, a center axis direction position as a position of the reflecting object along the center axis of the radar apparatus; calculates, based on the horizontal azimuth angle indicated by the object information and the center axis direction position, a horizontal direction position as a position of the reflecting object along a horizontal direction orthogonal to the center axis; and calculates, based on the projection distance and the horizontal direction position, a vertical direction position as a position of the reflecting object along a vertical direction orthogonal to the center axis and the horizontal direction.

4. The position detecting apparatus according to claim 3, wherein
the position calculation unit is configured not to calculate the position of the reflecting object in the case where the horizontal azimuth angle indicated by the object information is not included in a predetermined horizontal azimuth angle range including the horizontal direction of a travelling direction of the mobile body.

5. The position detecting apparatus according to claim 3, wherein
the position calculation unit is configured not to calculate a position of the reflecting object in the case where an estimated horizontal direction position calculated based on the object distance and the horizontal azimuth direction angle indicated by the object information is not included in a predetermined width direction range including the mobile body.

6. The position detecting apparatus according to claim 1, wherein
the position calculation unit is configured not to calculate a position of the reflecting object in the case where a continuous detection number as the number of detection where the radar apparatus continuously detects the reflecting object is less than a predetermined calculation determination number.

7. The position detecting apparatus according to claim 1, wherein
the position calculation unit is configured not to calculate the position of the reflecting object in the case where the radar apparatus continuously detects the reflecting object and a tracking distance between the observation point detected earliest and the observation point detected latest is less than a predetermined calculation determination tracking distance.

8. The position detecting apparatus according to claim 1, wherein
the position calculation unit is configured not to calculate the position of the reflecting object in the case where the object distance indicated by the object information is longer than a calculation determination distance.

9. The position detecting apparatus according to claim 1, wherein
the position calculation unit is configured to determine, based on at least one of a vehicle speed, a steering angle, a front acceleration, a rear acceleration, a left acceleration and a right acceleration of the mobile body, whether the position of the reflecting object is to be calculated.

10. The position detecting apparatus according to claim 1, further comprising a collision determination unit configured to determine, based on the position of the reflecting object calculated by the position calculation unit, whether the mobile body collides with the reflecting object.

11. The position detecting apparatus according to claim 1, wherein
the projection plane is perpendicular to the center axis.

* * * * *